United States Patent

Besecke et al.

[11] Patent Number: 5,300,601
[45] Date of Patent: Apr. 5, 1994

[54] SUSPENSION POLYMERS BASED ON METHYL METHACRYLATE

[75] Inventors: Siegmund Besecke, Seeheim-Jugenheim; Wilfried Schoen, Ingelheim; Karl-Ludwig Endlich, Mainz, all of Fed. Rep. of Germany

[73] Assignee: BASF Aktiengesellschaft, Ludwigshafen, Fed. Rep. of Germany

[21] Appl. No.: 801,293

[22] Filed: Dec. 2, 1991

[30] Foreign Application Priority Data

Dec. 4, 1990 [DE] Fed. Rep. of Germany ....... 4038625

[51] Int. Cl.$^5$ .......................... C08F 4/38; C08F 20/14; C08F 4/36
[52] U.S. Cl. ................................ 526/228; 526/329.7; 526/232.3
[58] Field of Search .................. 526/232.3, 228, 329.7

[56] References Cited

U.S. PATENT DOCUMENTS

| | | | |
|---|---|---|---|
| 3,726,846 | 4/1973 | Squire et al. | 526/228 |
| 3,900,453 | 8/1975 | Shimada et al. | 526/224 |
| 4,130,700 | 12/1978 | Kamath | 526/73 |
| 4,661,571 | 4/1987 | Kato et al. | 526/216 |
| 4,837,138 | 6/1989 | Horie | 430/106 |

FOREIGN PATENT DOCUMENTS 1402949 of 0000 United Kingdom .

OTHER PUBLICATIONS

JP 71/3183 Chem. Abst.
JP 87/177001 Chem. Abst.

Primary Examiner—Joseph L. Schofer
Assistant Examiner—Wu C. Cheng
Attorney, Agent, or Firm—Keil & Weinkauf

[57] ABSTRACT

Suspension polymers of
a) from 80 to 100% by weight of methyl methacrylate and
b) from 0 to 20% by weight of further monomers capable of undergoing free radical polymerization, are obtainable by polymerization at a temperature of from 100° to 140° C. which is virtually constant over the major part of the polymerization time by means of an initiator system consisting of two or more peroxide initiators I having different decomposition temperatures T at which in each case half of the initiator has decomposed after 1 hour, wherein
  the initiator $I_{min}$ having the lowest decomposition temperature has a decomposition temperature $T_{min}$ of from 60° to 100° C.,
  the initiator $I_{max}$ having the highest decomposition temperature has a decomposition temperature $T_{max}$ of from 100° to 140° C., the difference between $T_{max}$ and $T_{min}$ is greater than 10° C. and $I_{max}$ is a perketal of the general formula (1)

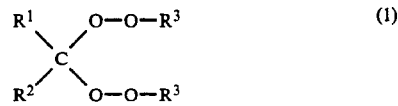

where $R^1$ and $R^2$ are identical or different alkyl radicals of 1 to 5 carbon atoms and $R^1$ and $R^2$ may be bonded to form a 5-membered or 6-membered ring and $R^3$ is tert-butyl or tert-amyl, and
further initiators $I_n$ which, if desired, may be concomitantly used have decomposition temperatures $T_n$ of from $T_{min}$ to $T_{max}$.

2 Claims, No Drawings

SUSPENSION POLYMERS BASED ON METHYL METHACRYLATE

The present invention relates to suspension polymers of
a) from 80 to 100% by weight of methyl methacrylate and
b) from 0 to 20% by weight of further monomers capable of undergoing free radical polymerization, obtainable by polymerization at a temperature of from 100° to 140° C., virtually constant over the major part of the polymerization time, by means of an initiator system of two or more peroxide initiators I having different decomposition temperatures T at which half of each initiator has decomposed after 1 hour, wherein the initiator $I_{min}$ having the lowest decomposition temperature has a decomposition temperature $T_{min}$ of from 60° to 100° C., the initiator $I_{max}$ having the highest decomposition temperature has a decomposition temperature $T_{max}$ of from 100° to 140° C., the difference between $T_{max}$ and $T_{min}$ is greater than 10° C. and $I_{max}$ is a perketal of the general formula (1)

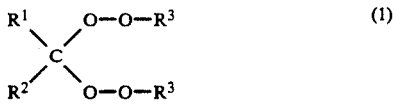

where $R^1$ and $R^2$ are identical or different alkyl radicals of 1 to 5 carbon atoms and may be bonded to form a 5-membered or 6-membered ring and $R^3$ is tertbutyl or tert-amyl, and further initiators $I_n$ which, if desired, may be concomitantly used have decomposition temperatures $T_n$ of from $T_{min}$ to $T_{max}$.

The present invention furthermore relates to a process for the preparation of these polymers and to their use for the production of moldings and to the moldings themselves.

The suspension polymerization of methyl methacrylate with or without further monomers is generally known in many embodiments. In the presence of free radical polymerization initiators, for example organic peroxides and azo compounds, methyl methacrylate can be polymerized under an inert gas atmosphere, usually at from 20° to 170° C. at atmospheric or slightly superatmospheric pressure. Moldings of these polymers, which are also referred to as acrylic glass, have to meet high quality requirements, for example with regard to little natural color, high transparency, good surface gloss and absence of bubbles and waviness. Since these properties depend on, inter alia, the residual monomer content, it is generally desirable to keep this residual monomer content as low as possible, for example by devolatilization of the polymer or by choosing special polymerization conditions, such as long polymerization times, by a certain temperature program or by using certain initiators.

According to JP-B 71/03183, the suspension polymerization of methyl methacrylate by means of an initiator system consisting of lauroyl peroxide and 1,1-azobis-1-cyclohexanenitrile at from 90° to 135° C. gives a residual monomer content of less than 0.3% by weight; however, this is achieved at the expense of the relatively long polymerization time of 8 hours.

For the polymerization of monomers, including methyl methacrylate, JP-A 81/177 001 recommends the use of two different initiators, 2,2-bis-(tert-butylperoxy)octane also being mentioned as an initiator.

DE-A 2 756 035 discloses the polymerization of vinyl monomers in two or more stages at progressively higher temperatures of from 70° to 150° C. by means of an initiator system consisting of a readily decomposing initiator and a slowly decomposing initiator, the latter being a di-tert-butyl perketal of a ketoalkanoic ester. Among the large number of monomers which can be polymerized by this method, methyl methacrylate is also mentioned but the experimental investigations are concerned only with styrene.

A similar process for the copolymerization of vinyl acetate with vinyl esters of other fatty acids is disclosed in DE-A 2 229 569, the di-tert-butylperketal of butanone being recommended as the initiator having a relatively high decomposition temperature.

It is an object of the present invention to provide high quality suspension polymers which are based on methyl methacrylate, have a low residual monomer content and high transparency to light and are obtainable in shorter polymerization times than was possible to date.

We have found that this object is achieved by the polymers defined at the outset.

We have also found a process for their preparation and their use for the production of moldings.

Homopolymers of methyl methacrylate are preferred. In addition, the polymers may also be composed of not more than 20% by weight of further monomers, preferably of $C_1$-$C_6$-alkyl esters of acrylic acid,
$C_2$-$C_6$-alkyl esters of methacrylic acid
and in addition of
acrylic and methacrylic acid,
hydroxyalkyl esters,
aminoalkyl esters and
aminoalkylamides of acrylic and methacrylic acid where the alkyl radicals are of not more than 6 carbon atoms,
acrylamide and methacrylamide and their N-alkyl- and dialkyl derivatives where alkyl is of 1 to 6 carbon atoms,
vinyl esters of aliphatic $C_2$-$C_{18}$-carboxylic acids and vinyl aromatics, such as styrene and α-methylstyrene and of mixtures of these monomers.

Examples of suitable initiators $I_{min}$ are
aliphatic and aromatic diacyl peroxides, such as
diisononanoyl peroxide (T=78°),
didecanoyl peroxide (T=80° C.),
dilauroyl peroxide (T=80° C.) and
dibenzoyl peroxide (T=91° C.),
peroxydicarbonates, such as
diisopropyl peroxydicarbonate (T=61° C.), and
alkyl peresters, such as
tert-butyl perneodecanoate (T=64° C.),
tert-amyl perpivalate (T=71° C.),
tert-butyl perpivalate (T=74° C.), and
tert-butyl per-2-ethylhexanoate (T=92° C.).

Initiators $I_{max}$ are the perketals (1) according to the definition, among which
1,1-bis-(tert-butylperoxy)-3,3,5-trimethylcyclohexane (T=114° C.),
1,1-bis-(tert-butylperoxy)-cyclohexane (T=117° C.) and
2,2-bis-(tert-butylperoxy)-butane (T=124° C.)
are preferred.

For a particularly uniform control of the polymerization and hence for the production of polymers having a very uniform molecular weight, it is advisable concomitantly to use further initiators $I_n$ whose decomposition temperatures are from $T_{min}$ to $T_{max}$, and the decomposition temperatures of these initiators should differ from one another or from $T_{min}$ and $T_{max}$ by from 10° to 20° C. in each case.

Suitable further initiators $I_n$ of this type are those stated for $I_{min}$ and $I_{max}$. For the decomposition temperature range of from 100° to 140° C., it is also possible to use, for example, dialkyl peroxides, such as tert-butyl cumyl peroxide (T=138° C.), and alkyl peresters, such as tert-butyl perisononanoate (T=119° C.) and
tert-butyl perbenzoate (T=124° C.),
in addition to the perketals.

The stated values for the decomposition temperatures T for a 1-hour half life originate from the company publications A 3.2.1 and A 3.7.1 "Organische Peroxide" of Peroxid-Chemie GmbH. Other possible initiators are stated there.

The total amount of all initiators is preferably from 0.001 to 1, in particular from 0.01 to 0.1, mol %, based on the total amount of the monomers (a) and (b) used.

The amount of initiators having decomposition temperatures of from 100° to 140° C. is preferably from 20 to 80, in particular from 30 to 60, mol %, based on the total amount of initiator, of which not less than 25 mol should be accounted for by the perketal (1).

An improvement to obtain a very narrow weight molecular distribution is achieved by the usual concomitant use of molecular weight regulators in amounts of from 0.02 to 2% by weight, based on the total amount of the monomers. Such regulators, by means of which it is possible to obtain an average molecular weight of from 20,000 to 200,000, depending on the amount, are preferably alkyl mercaptans, such as n-dodecyl mercaptan and tert-dodecyl mercaptan.

An essential feature of the invention is to carry out the polymerization over the major part of the polymerization time at virtually constant temperature, i.e. in a very narrow temperature interval of ±2° C. from a selected initial temperature. Here, major part is understood as meaning not less than 50% of the total time. A relatively low initial temperature and lower or higher temperatures toward the end of the polymerization and intermediate deviations generally have no adverse effect on the product quality, but an isothermal reaction over the entire polymerization time is basically advantageous. If, in the case of large industrial batches, a temperature gradient is observed in the polymerization kettle, for example from the inside to the outside, the proviso of temperature constancy is applicable in each case to the temperature at the same point.

Since the polymerization temperature is above the boiling point of the methyl methacrylate, it is necessary to carry out the polymerization at least under the autogenous pressure of the polymerization mixture, i.e. at from 1.1 to 2.5 bar. However, in order to avoid vapor bubbles, it is particularly advantageous to work under a pressure which is from 0.5 to 20 bar above the autogenous pressure of the monomer mixture at the chosen reaction temperature, and this pressure can be generated by forcing in an inert gas, such as nitrogen.

Otherwise, the polymerization is carried out in a conventional manner by the method of mass polymerization or, preferably, suspension polymerization. For this purpose, the water and monomer phase is initially taken with the addition of conventional dispersants. Water-soluble substances or substances which have been rendered water-soluble, for example pectin, gelatine, methylcellulose or other cellulose ethers, are suitable for this purpose. Polyvinyl alcohol, alkali metal salts of polyacrylic acid or polymethacrylic acid or alkali metal salts of copolymers of methyl methacrylate and methacrylic acid may also be used. The water phase may furthermore be buffered; salts of phosphoric acid, for example mixtures of potassium dihydrogen phosphate and disodium hydrogen phosphate, are usually used for the alkaline range.

To improve the processing properties, heat stabilizers, for example sterically hindered phenols, and lubricants, for example stearic acid, may be added.

The molecular weight regulator and the novel initiator system are present in the monomer phase.

By repeatedly forcing in an inert gas, such as nitrogen, and then letting down the pressure each time, the reaction mixture is rendered inert. After forcing in inert gas again, the monomer phase is dispersed, initially at room temperature, by stirring in the water phase, after which the mixture is heated to the polymerization temperature, which is above the boiling point of methyl methacrylate in the range from 100° to 140° C. The pressure in the kettle is from 2 to 100 bar. After a reaction time of 4 hours, the polymerization is generally complete.

The novel polymers have very little natural color, high transparency and good surface gloss, are free from bubbles and waviness and possess a residual monomer content of, in general, less than 0.4% by weight and are obtainable in the particularly short polymerization times of from about 2 to 4 hours.

EXAMPLES 1 to 5

A mixture of 190 kg of demineralised water, 1.4 kg of the sodium salt of a copolymer of
64% by weight of methacrylic acid and
36% by weight of methyl methacrylate in the form of a 1.6% strength by weight aqueous solution, as dispersant, and 1.4 kg of sodium phosphate hydrate as a buffer and the monomer phase which is shown in the Table and contained the amounts, likewise stated there, of various initiator systems and the regulator n-dodecyl mercaptan was first flushed several times with nitrogen at room temperature, after which nitrogen at 0.5 bar was forced in and the mixture was heated to 125° C. while stirring and was kept at this temperature for 3 hours. After cooling and letting down the pressure, the polymer was separated off, washed and dried.

EXAMPLES 6 and 7

4,000 kg of the water phase, consisting of demineralised water, dispersant and buffer according to Examples 1 to 5, together with the monomer phase which is shown in the Table and contained the amounts, stated there, of various initiator systems, the regulator n-dodecyl mercaptan and the lubricant stearic acid, were flushed several times with nitrogen at room temperature while stirring. After $N_2$ had been forced in to an $N_2$ pressure of 0.5 bar, the mixture was heated to 128° C. and was kept at this temperature for 3 hours, the pressure in the kettle being about 4 bar. The reaction mixture was worked up according to Examples 1 to 5.

To check the quality, the following properties were measured:

Residual monomer content,
Melt flow index (MFI, 230° C./3.8 kp) according to DIN 53,735,
Solution viscosity according to DIN 51,562 and
UV transmittance.

The content of residual monomer was measured by means of gas chromatographic headspace analysis, a method for determining vaporizable components in liquids and solids (including monomers in thermoplastics).

$\eta$ = Viscosity of the polymer solution of defined concentration
$\eta_0$ = Viscosity of the solvent
C = Concentration of the solution in g/ml.

The UV transmittance is measured in order to test the UV light transmittance of the polymer, which transmittance can be adversely affected by residual amounts of initiators. Since a high UV transmittance is required in the case of polymethyl methacrylate, a transmittance of not less than 65% at 300 nm is necessary.

The details of these experiments and the results thereof are shown in the Table.

TABLE

| Example | Monomers and regulators [kg] | | Initiators I [g], decomposition temperatures T [°C.] | | Residual monomer content [% by wt.] | MFI [g/10 min] | VN [ml/g] | UV transmittance at 300 nm [%] |
|---|---|---|---|---|---|---|---|---|
| 1 | 174 | Methyl methacrylate | 111 $I_{min}^{2)}$, | 92 | 1.0 | 2.2 | — | 40 |
|   | 11 | Methyl acrylate | 79 $I_n^{3)}$, | 119 | | | | |
|   | 0.5 | n-Dodecyl mercaptan | | | | | | |
| 2 | 174 | Methyl methacrylate | 87 $I_{min}^{2)}$, | 92 | 0.25 | 2.2 | — | 50 |
|   | 11 | Methyl acrylate | 45 $I_{max}^{4)}$, | 124 | | | | |
|   | 0.55 | n-Dodecyl mercaptan | 76 $I_n^{3)}$, | 119 | | | | |
| 3 | 174 | Methyl methacrylate | 138 $I_{min}^{1)}$, | 80 | 0.25 | 2.2 | — | 70 |
|   | 11 | Methyl acrylate | 202 $I_{max}^{4)}$, | 124 | | | | |
|   | 0.55 | n-Dodecyl mercaptan | | | | | | |
| 4 | 174 | Methyl methacrylate | 133 $I_{min}^{1)}$, | 80 | 0.3 | 2.3 | — | 70 |
|   | 11 | Methyl acrylate | 118 $I_{max}^{5)}$, | 124 | | | | |
|   | 0.5 | n-Dodecyl mercaptan | 131 $I_{max}^{6)}$, | 117 | | | | |
| 5 | 125 | Methyl methacrylate | 101 $I_{min}^{2)}$, | 92 | 0.3 | 300 | — | — |
|   | 14 | Butyl acrylate | 71 $I_{max}^{5)}$, | 124 | | | | |
|   | 1.3 | n-Dodecyl mercaptan | 82 $I_n^{3)}$, | 119 | | | | |
| 6 | 3650 | Methyl methacrylate | 1910 $I_{min}^{2)}$, | 92 | 1.0 (0.3)* | 1.6 | 74 | — |
|   | 150 | Methyl acrylate | 2030 $I_n^{3)}$ | 119 | | | | |
|   | 13 | Stearic acid | | | | | | |
|   | 10 | n-Dodecyl mercaptan | | | | | | |
| 7 | 3650 | Methyl methacrylate | 1910 $I_{min}^{2)}$, | 92 | 0.3 | 1.6 | 69 | — |
|   | 150 | Methyl acrylate | 830 $I_{max}^{4)}$, | 124 | | | | |
|   | 13 | Stearic acid | 1630 $I_n^{3)}$, | 119 | | | | |
|   | 11 | n-Dodecyl mercaptan | | | | | | |

*After devolatilization

Explanations for the Table:
1) Dilauroyl peroxide
2) tert-Butyl per-2-ethylhexanoate
3) tert-Butyl per-3,5,5-trimethylhexanoate
4) 2,2-Bis-(tert-butylperoxy)-butane; 50% strength solution in aliphatics (it is not possible to provide more exact data on the composition since it is a commercial product of Peroxid Chemie GmbH)
5) 2,2-Bis-(tert-butylperoxy)-butane; 50% strength solution in white oil
6) 1,1-Bis-(tert-butylperoxy)-cyclohexane; 50% strength solution in white oil The melt flow index MFI (dimension g/10 min) is an international parameter for the flow behavior of thermoplastics and is dependent on the degree of polymerization. It indicates the amount of a polymer which is forced, in the course of 10 minutes, through a standardized nozzle from a cylindrical cavity by means of a ram applying a certain specific load. The melt flow index decreases sharply with increasing degree of polymerization; the smaller its value, the poorer the flow of the polymer, i.e. the higher its molecular weight.

The solution viscosity is expressed by the viscosity number VN, which indicates a relative increase in the viscosity of a solvent by from 0.1 to 1.0 g/100 ml of dissolved polymer, divided by the concentration in g/100 ml. The viscosity numbers increase with the degree of polymerization.

$$VN = \left(\frac{\eta}{\eta_0} - 1\right) \cdot \frac{1}{C}$$

$\frac{\eta}{\eta_0}$ = Viscosity ratio where

We claim:

1. A process for the preparation of a suspension polymer of
a) from 80 to 100% by weight of methyl methacrylate and
b) from 0 to 20% by weight of further monomers capable of undergoing free radical polymerization,
by polymerization by means of an initiator system consisting of two or more initiators I having different decomposition temperatures T of from 60° to 140° C., at which in each case half the initiator has decomposed after 1 hour, wherein
the initiator $I_{min}$ having the lowest decomposition temperature possesses a decomposition temperature $T_{min}$ of from 60° to 100° C.,
the initiator $I_{max}$ having the highest decomposition temperature possesses a decomposition temperature $T_{max}$ of from 100° to 140° C., the difference between $T_{max}$ and $T_{min}$ is greater than 10° C. and $I_{max}$ is a perketal of the formula (1)

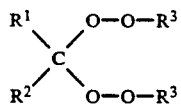

where $R^1$ and $R^2$ are identical or different alkyl radicals of 1 to 5 carbon atoms and $R^1$ and $R^2$ may be bonded to form a 5-membered or 6-membered ring and $R^3$ is tert-butyl or tert-amyl, and further initiators $I_n$ which, if desired, may be concomitantly used have a decomposition temperature $T_n$ of from $T_{min}$ to $T_{max}$ and the polymerization temperature is from 100° to 140° C. and is kept virtually constant over the major part of the polymerization time.

2. A process for the preparation of a suspension polymer as defined in claim 1, wherein the polymerization is carried out by forcing in an inert gas under a pressure which is from 0.5 to 20 bar above the autogenous pressure of the monomer mixture at the chosen reaction temperature.

* * * * *